Figure 1:
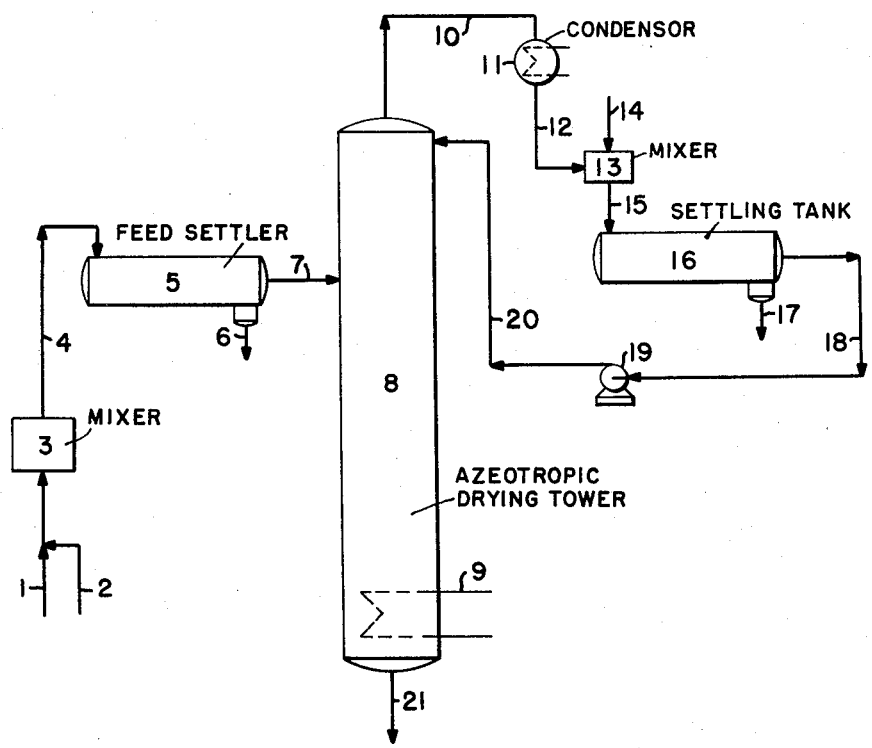

June 28, 1960    J. F. ROSS    2,943,123
POLYMERIZATION DILUENT PURIFICATION PROCESS
Filed Sept. 26, 1958    3 Sheets-Sheet 1

James Francis Ross    Inventor
By L. C. Hassan    Attorney

United States Patent Office 2,943,123
Patented June 28, 1960

2,943,123

POLYMERIZATION DILUENT PURIFICATION PROCESS

James Francis Ross, Baton Rouge, La., assignor to Esso Research and Engineering Company, a corporation of Delaware Filed Sept. 26, 1958, Serial No. 763,537

4 Claims. (Cl. 260—674)

This invention relates to the purification of diluents used in the low-pressure polymerization of olefins and more particularly relates to the purification of contaminated recycle diluents.

Diluents recovered from the low-pressure polymerization process carried out with Ziegler-type catalysts are usually purified by vaporizing all volatile components in the contaminated diluent, rectifying the vaporized diluent into a substantially alcohol-free diluent and an alcohol-containing fraction, water washing the alcohol-free diluent and azeotropically drying the diluent which is then recycled to the polymerization process. Purification is necessary since the presence of impurities such as alcohol, water and chelating agents will poison the polymerization catalyst. The water washing step is employed to partially remove chelating agents such as acetylacetone and diacetyl. The chelating agent will distribute between the water and diluent layers depending on their partition coefficients and the diluent to water ratio. The portion of the chelating agent remaining in the diluent layer will be partially separated by the azeotropic drying step. However, that part of the chelating agent which is not separated by the azeotropic drying step will continue to increase in concentration causing the solubility of water in the diluent phase to increase to such an extent that the azeotropic drying tower becomes inoperative unless some of the diluent is continuously or intermittently removed to decrease the concentration of chelating agent in the system. The removal of part of the diluent for this purpose is, of course, wasteful, time consuming and expensive.

It has now been found that adding steam or water to the azeotropic drying tower or adding an aqueous solution to the distillate therefrom followed by separation of the aqueous layer and recycle of the diluent layer to the drying tower will result in removal of most of the chelating agent and permit the recovery in substantially pure form of substantially all of the diluent that had been introduced into the purification system.

The diluents purified by the present invention are aromatic hydrocarbons such as benzene, toluene, xylene and the like which are employed as the diluent of choice in the polymerization of propylene and higher alpha olefins.

While it does not comprise part of the invention, a general description of the low-pressure polymerization process will be provided for the purpose of completeness. The low-pressure polymerization reaction is carried out by contacting an olefin feed stream containing the olefins to be polymerized with a polymerization catalyst at a temperature in the range of −50 to 100° C. The polymerization catalysts are generally systems made up of a mixture of a reducible heavy transition metal compound such as titanium tetrachloride, titanium trichloride and titanium trichloride cocrystallized with aluminum chloride, and a reducing agent such as an organo-metallic compound, e.g. triethyl aluminum and diethyl aluminum chloride. Other reducing agents such as alkali and alkaline earth metals and hydrides and alloys of aluminum hydrides and the like can also be used. The reducible heavy transition metal compounds most often used are the halides, acetylacetonates and other compounds of the metals of groups IV through VI and VIII of the periodic table. Batch or continuous olefin polymerization processes can be used. Atmospheric pressures are usually adequate, but the polymerization reaction can be carried out at sub or supra atmospheric pressures. When the polymerization reaction has progressed to the desired extent, from about 0.2 to 2 parts of a $C_1$ to $C_8$ alkanol such as isopropyl alcohol and n-butyl alcohol per part of reaction mixture is added together with a chelating agent such as a 2,4-diketone, e.g. acetylacetone or diacetyl to complex the catalyst prior to filtration or other physical removal of the precipitated polymeric product. The polymeric product can then be treated with hydrochloric acid, water washed and then dried. The aromatic hydrocarbon diluent which is separated from the polymeric product and which contains alcohol and the chelating agent is then rectified into a substantially diluent fraction and a substantially alcohol fraction. The diluent fraction is then purified by the process of the invention.

To more fully understand the invention, reference will now be made to the drawings which are schematic flow plans of three embodiments of the diluent purification process in accordance with this invention.

Referring first to Figure 1, which is the preferred embodiment, aromatic diluent from the low-pressure polymerization process which is contaminated with an organic chelating agent and a $C_1$ to $C_8$ alkanol is introduced through line 1 together with water which is introduced through line 2 into a mixer 3. In general, from 20 to 500 vol. % water, preferably 50 to 200 vol. % is used based on aromatic diluent. The diluent-water mixture is then passed from mixer 3 through line 4 to a feed settler 5. The mixture is then allowed to settle therein and a water layer removed through line 6. The diluent layer is then passed through line 7 into an azeotropic drying tower 8. Drying tower 8 is heated by heater 9 which can be a superheated steam heater or other heater normally used to heat distillation towers. Distillate is then taken overhead through line 10 to condenser 11 and from condenser 11 into mixer 13 through line 12. An aqueous solution is introduced through line 14 into mixer 13. Mixer 13 is preferably an aspirator type mixer, although other mixers such as orifice mixers, high shear agitators and centrifugal pumps can be used. The condensed diluent-aqueous solution mixture is then passed from mixer 13 through line 15 into settling tank 16 and allowed to settle. Then the aqueous layer is removed through line 17 and a diluent layer removed through line 18, passed through pump 19 into line 20 and thence to drying tower 8. Pure diluent is taken off through line 21 at the bottom of drying tower 8. This diluent is then used in low-pressure polymerization reactions.

The aqueous solution introduced through line 14 can be water, or aqueous solutions of acids or bases such as sulfuric acid at pH preferably below 2 or sodium hydroxide at pH preferably above 12 or acidic, basic or neutral aqueous solutions of metallic ions such as cupric and ferric ions that react with the chelating agents to form water soluble complexes. The following solutions are preferred and are listed in order of choice:

(1) Caustic solutions having a pH greater than 12; e.g. an aqueous solution containing from 1 to 4 wt. % NaOH.

(2) Cupric sulfate or ferric sulfate solutions containing from 0.02 to 0.2 wt. %, preferably 0.1 wt. % of the sulfate salt.
(3) Ammonia solution containing from 0.5 to 1 wt. % NH₃.
(4) Acidic solutions of H₂SO₄ or HCl having a pH less than 2; e.g. containing from 1 to 4 wt. % acid.

The aqueous solution is introduced through line 14 into mixer 13 in amount sufficient to provide from 20 to 500 vol. %, preferably 50 to 200 vol. % aqueous solution based on the total contents of the mixer.

Figure 2:
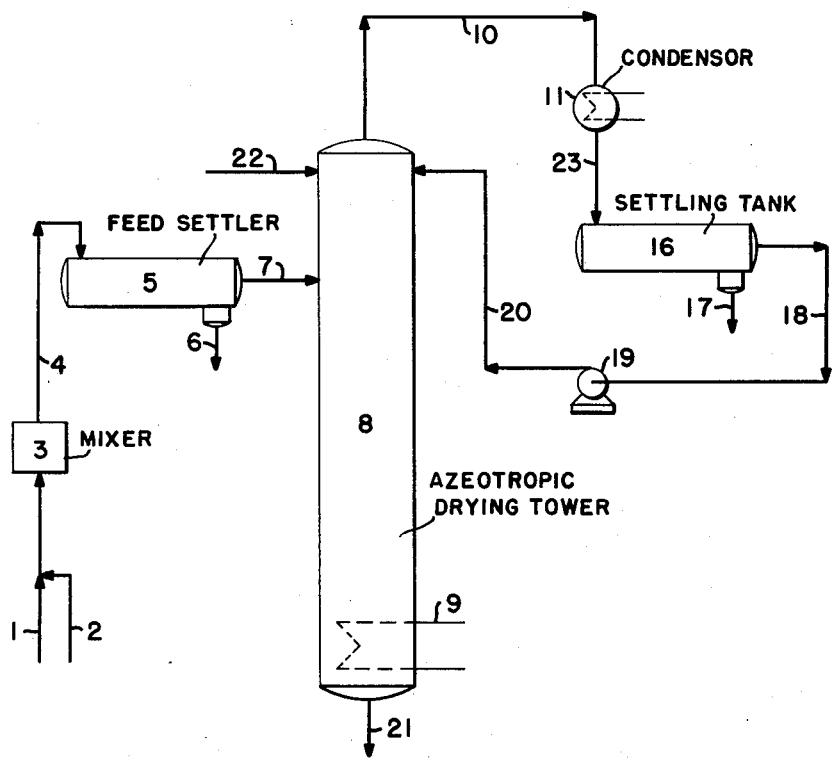

Figure 2 is a second embodiment of the invention and is identical to Figure 1 except that steam or water is introduced through line 22 into drying tower 8 rather than introducing an aqueous solution through line 14 into mixer 13 as in Figure 1. In Figure 2 the condensed distillate from condenser 11 is passed through line 23 directly into settling tank 16.

Figure 3:
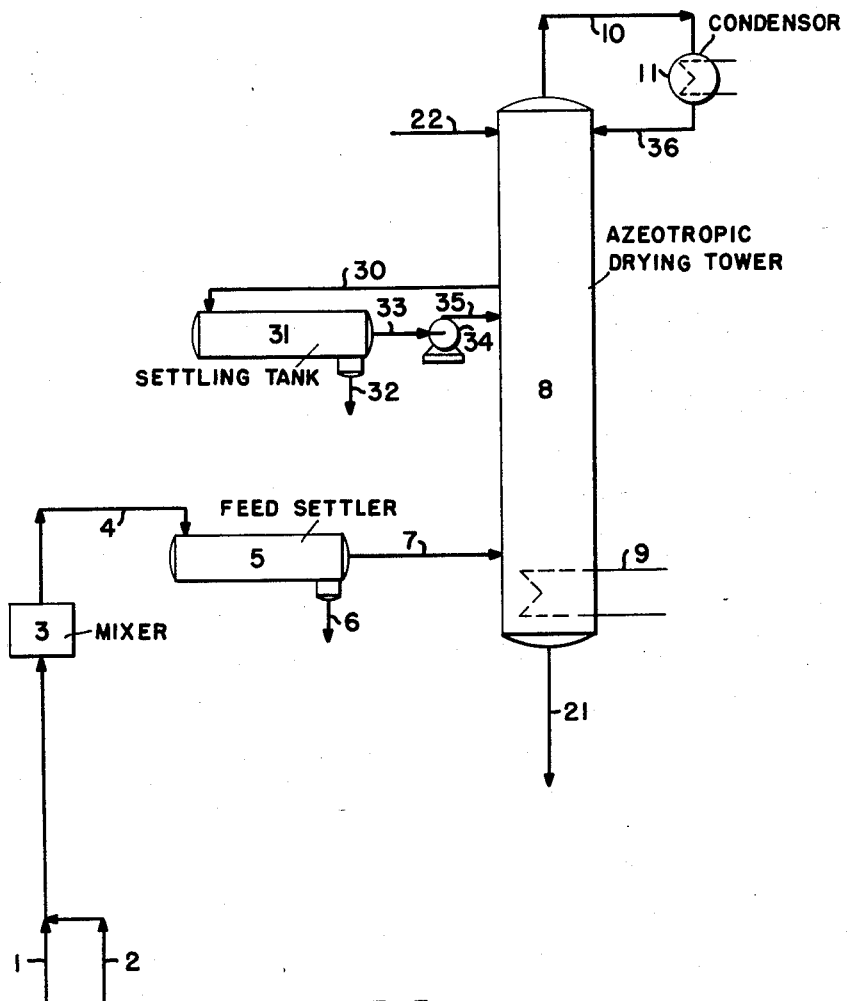

Figure 3 represents a third embodiment of the invention. Steam or water is introduced at the top of tower 8 through line 22 as in Figure 2. However, the water is removed from drying tower 8 by continuously removing a portion of the liquid from the tower preferably from between the 3rd to 8th plates from the top of the tower. The liquid is passed through line 30 to settling tank 31. A water layer is removed through line 32 and a diluent layer passed through line 33 to pump 34 and from there through line 35 to tower 8. Distillate from the tower is passed through line 10 to condenser 11 and back to tower 8 through line 36.

The following example is an operating example for the removal of acetylacetone from xylene according to the preferred embodiment shown in Figure 1.

EXAMPLE

A xylene bottom side stream from a methanol-xylene rectifier is introduced into the system through line 1. The system is operated at a reboil rate of 150% of the feed and water is introduced through line 2 at a rate of 1.0 v./v. based on the xylene from line 1. The temperature of the water-xylene mixture in line 4 is 194° F. The temperature at the bottom of drying tower 8 is 290° F. and the temperature of the vapors in line 9 is 270° F. Drying tower 8 contains 21 trays and the xylene layer introduced through line 7 is introduced into the third tray from the top of the tower which is maintained at a temperature of 284° F. The temperature in the settling tank 11 is maintained at 194° F. Water is introduced through line 14 at a rate of 1 v./v. based on the xylene distillate from line 12. The entire system is operated at about atmospheric pressure. The following table gives the rates and the compositions of the streams in different parts of the system.

Table I

| Stream | 1 | 2 | 7 | 6 | 10 | 18 | 17 | 21 |
|---|---|---|---|---|---|---|---|---|
| Rates, lb./hr.: | | | | | | | | |
| Xylene | 70,380 | 0 | 70,296 | 84 | 84,600 | 84,600 | 84 | 70,296 |
| Water | | 84,000 | 350 | 83,650 | 770 | 420 | 84,000 | 0 |
| Acetylacetone | 13 | 0 | 6.5 | 6.5 | 22 | 16 | 12.3 | 0.7 |
| Total | 70,393 | 84,000 | 70,652.5 | 83,740.5 | 85,392 | 85,036 | 84,096.3 | 70,296.7 |
| Conc., p.p.m.: | | | | | | | | |
| Xylene | (¹) | 0 | (¹) | 100 | (¹) | (¹) | 100 | (¹) |
| Water | 0 | (¹) | 5,000 | (¹) | 9,100 | 5,000 | (¹) | 0 |
| Acetylacetone | 185 | 0 | 92.5 | 77.5 | 260 | 185 | 154 | 10 |

¹ Main stream.

It can be seen from the above table that the introduction of water into the contaminated xylene distillate continuously removes acetylacetone from the xylene distillate to prevent a large build-up of acetylacetone in the top of tower 8.

Modifications of the above process can, of course, be made by those skilled in the art without departing from the spirit and the scope of the invention.

What is claimed is:

1. A process for purifying a substantially alcohol free single ring aromatic hydrocarbon diluent contaminated with a 2,4-diketone chelating agent and recovered from a diluent-alkanol rectifier used to rectify liquid separated from a low-pressure catalytic olefin polymerization reaction mixture comprising the steps of mixing said contaminated diluent with water, separating a diluent layer, vaporizing said diluent layer, contacting said vaporized diluent with an aqueous medium selected from the group consisting of steam, water, aqueous acid, aqueous base, and solutions of metallic ions that form water soluble complexes with the chelating agent contaminant, separating the aqueous medium from the diluent, returning said separated diluent layer to said vaporizing step, and withdrawing substantially pure diluent therefrom.

2. The process of claim 1 wherein the chelating agent contaminant is acetylacetone.

3. The process of claim 2 wherein said aromatic hydrocarbon diluent is xylene.

4. The process according to claim 1 wherein the vaporized diluent is first condensed before being treated with the aqueous medium.

References Cited in the file of this patent

UNITED STATES PATENTS 1,741,305   Jaeger _____ Dec. 31, 1929
2,773,053   Field et al. _____ Dec. 4, 1956